United States Patent Office 2,971,835
Patented Feb. 14, 1961

---

2,971,835

RECOVERY OF NICKEL AND COBALT FROM MIXTURES OF THE SAME WITH IRON SULFIDE, AS IMPURITY

Raphael F. Matson, New Orleans, La., assignor to Freeport Sulphur Company, New York, N.Y., a corporation of Delaware No Drawing. Filed Feb. 17, 1958, Ser. No. 715,486

12 Claims. (Cl. 75—115)

---

This invention relates to the recovery of the nickel and cobalt content, and incidentally also any other valuable non-ferrous metal content, from mixtures of sulfides of such metals with iron sulfides, or with both iron sulfides and aluminum oxide or aluminum basic sulfate. More particularly, it relates to the treatment of crude nickel-cobalt sulfide concentrates obtained in a separation step following acid leaching of ferruginous, lateritic, nickel ores, for the purification of the valuable metal content.

The crude nickel-cobalt concentrates are obtainable, for example, from the types of ore and by the leaching processes set forth in the copending application of Courtney S. Simons et al., Serial No. 605,240, filed August 10, 1956. There, nickeliferous lateritic limonitic ores are described as being leached with sulfuric acid whereby a leach liquor is produced containing the sulfates of nickel, cobalt, copper and zinc with smaller amounts of iron, aluminum, manganese, chromium and magnesium, which leach liquor is subjected to sulfidation to precipitate the nickel, cobalt, copper and zinc in the form of sulfides, leaving most of the iron but not all of it and the other metals in the residual solution, the precipitation process utilized being described in more detail in U.S. Patents No. 2,722,480 and No. 2,726,953.

It has heretofore been suggested that the nickel and cobalt content of these precipitates or concentrates be purified for the removal of iron by selectively redissolving the nickel-cobalt content. This separation is accomplished by introducing air or oxygen into an acidified aqueous slurry of the concentrate under pressure. See U.S. Patents No. 2,588,265 and No. 2,718,455. In these prior processes, the oxidation is said to convert the nickel and cobalt into soluble sulfates and at least a portion if not all of the iron into an insoluble basic iron sulfate which is thereupon filtered out.

The separation of the iron content from the nickel-cobalt content by these prior procedures is not complete. The precipitation of the iron carried with it a prohibitive proportion of the nickel and cobalt values which necessitates additional treatment for the recovery of these values from the iron residue. This treatment or recovery operation is difficult to acomplish because of the presence of the iron in oxidized form with the nickel and cobalt sulfides to be dissolved. Furthermore the sulfate solution obtained in these prior oxidation processes retains a prohibitive amount of iron dissolved therein, and this iron must be removed in an additional purification step.

In these prior oxidation processes, attempts are apparently made to dissolve all of the nickel and cobalt values from the concentrates through the action of the oxygen. Now it has been found that when this oxidation is carried to completion or to a point of maximum dissolution of nickel and cobalt, ferric oxide and basic iron sulfate begin to precipitate before all of the nickel and cobalt values have been converted from the sulfide form to the sulfate form, and the presence of this ferric oxide and basic iron sulfate precipitate prevents solubilization of a part of the nickel and cobalt sulfide values. Recovery of these values is extremely difficult if this precipitated residue is combined with iron precipitated and removed from the sulfate solution in a subsequent purification step.

The primary object of the invention is to simplify and reduce the number of steps required for purifying iron-containing nickel-cobalt sulfide concentrates.

A more immediate object of the invention is to provide a process for sulfating and dissolving the nickel and cobalt values from the above-described mixed sulfide concentrates without oxidizing the iron and precipitating the same in the form of the oxide or the basic sulfate, in which process all of the sulfide content of the concentrate ultimately goes into solution in the form of sulfates.

Another object is to separate the cobalt and nickel values from the iron contained in said concentrates by a process which avoids the necessity of two treatments heretofore applied (one to the impure nickel-cobalt solution and the other to the precipitated iron residue).

Broadly defined, the instant invention may be considered to involve an improvement in the treatment of mixtures of non-ferrous metal sulfides with ferrous sulfide impurity for the purpose of recovering the non-ferrous metals in purer form wherein oxygen is introduced into an acidic aqueous suspension of the sulfide mixture while the suspension is maintained at an elevated temperature under pressure above the vapor pressure of the solution until substantial but incomplete sulfation and dissolution of the metal content including the iron content has occurred, this sulfation operation being stopped before any of the iron content has precipitated, after which the product liquor containing the dissolved metal sulfates derived from most of the nickel, cobalt and iron is separated from the undissolved metal sulfide content, and treated for the precipitation of the iron in accordance with known procedures.

The prevention of the precipitation of the iron is accomplished by maintaining a predetermined, adequate amount of sulfide in the aqueous suspension of the metal sulfides during the entire oxidation treatment. The presence of the free sulfides apparently prevents oxidizing conditions from arising in the suspension which are sufficiently active to cause oxidation of the iron to a form which precipitates either as the basic iron sulfate or the oxide form, under the temperature and other conditions maintained for dissolving the sulfides. The maintenance of adequate sulfides in the aqueous suspension is suitably accomplished by timely discontinuance of the oxidizing treatment or withdrawing the product liquor containing the sulfates from the oxidizing reactor before too much of the sulfide has been dissolved and adding fresh sulfide slurry to the reactor in amounts equivalent to the water and sulfates withdrawn.

In a preferred embodiment of the invention, the process is operated continuously by filtering the oxidized slurry withdrawn from the reactor to separate the undissolved sulfide solids and recycling these acid-soluble solids to the reactor to which fresh sulfide concentrate is added with additional dilute sulfuric acid, the oxygen or oxygen-containing gas, such as air, being continuously introduced. When the oxidation process for dissolving the sulfide concentrate is carried out in this manner, none of the iron is oxidized or precipitated and all of the sulfided metal including the iron contained in the concentrate treated ultimately goes into solution in the sulfate form.

To maintain the required oxidizing conditions in the reactor the minimum recycle rate of undissolved sulfide solids is about 10% of the fresh input sulfide rate. Any lower percentage involves danger of iron oxidation and precipitation. The preferred recycle rates are in the range of 50–100% of the input sulfide rate. Although higher rates are possible, they may increase the handling difficulties and decrease the capacity of the equipment.

Ordinarily the aqueous suspensions of the mixed sulfide concentrates produced by the processes described in the hereinbefore mentioned application and patents may be subjected to the oxidation process of the present invention without the addition of acid, for sufficiently acidic conditions can be developed through the oxidation itself. If desired or required, sulfuric acid may be added. The oxidation is preferably carried out at a pH value below about 3.

The temperature, pressure and oxygen-introduction rate used in the performance of the present invention are, or may be, the same as those set forth in the Patent No. 2,588,265 and other references. The successful temperature range generally falls between 230° and 375° F. Temperatures ranging between about 350 and 360° F. are preferable. Higher acidities and higher temperatures can be employed but without advantage. The pressure during the operation should be maintained at a level above the vapor pressure of the solution. Some evaporation of water, such as about 10%, could be allowed but without advantage except as to the possibility of using less expensive equipment. The rate of air introduction may be varied to a considerable extent but the preferred rate is that which causes 50 to 75% of the oxygen contained in the air to be consumed in the reaction, the unconsumed oxygen being discharged from the vessel together with the inert nitrogen, water vapor, and other gases. Lower air rates provide an undesirably slow rate of oxidation and higher rates cause excessive evaporation of water.

A typical sulfide concentrate to which the process of the invention is applicable has the following composition, all of the metals being present in the sulfide form:

|   | Percent |
|---|---|
| Nickel | 58 0 |
| Cobalt | 7.0 |
| Iron | 0.5 |
| Chromium | 0.3 |
| Copper | 0.5 |
| Zinc | 2.0 |
| Aluminum and other trace materials | 0.2 |
| Sulfur | 31.5 |
|   | 100.0 |

*Example*

A sulfide concentrate of the above mentioned constitution was slurried in water together with an equal amount of recycle sulfides (suspended solids which are later separated from the product sulfate liquor hereinafter described) and sulfuric acid added in quantities providing a 16% suspension of sulfides in a 1.5% sulfuric acid solution. This slurried concentrate was then continuously introduced into and through an autoclave provided with an agitating rotor. The rate of the feed was 2½ gallons per minute, and air was introduced under the agitating rotor in a total amount equal to twice that required to oxidize the sulfide content to the sulfate form. Steam was introduced into the slurry at a rate which heated it and maintained the same at a temperature of 350° F. Steam and excess air, or air partially depleted in oxygen, were vented from the autoclave at a rate which maintained the pressure in the autoclave at 600 lbs. per square inch. The slurry passed through the autoclave in a period of 20 minutes. During this period 50% of the sulfide content was sulfated leaving the rest of the sulfide in suspension.

The suspension leaving the autoclave was then flowed through a filter or other separating device thereby providing the suspended sulfide solids for recycling in the process and a product liquor containing the dissolved portion of the nickel and other valuable metals and as well, the iron. This iron may then be separated from the sulfates of the valuable metals in any one of a number of ways, several of which are known. A suitable means for accomplishing the separation of iron from this sulfate solution involves adding ammonia thereto until a pH of about 5 is reached and introducing air thereby causing the iron to be completely precipitated. Upon filtration, the nickel, cobalt and other valuable metals are obtained in a condition substantially free of iron.

Since the precipitation of the iron carries with it a small percentage of the nickel and cobalt, this precipitate may be dissolved in acid and again treated with ammonia and air, and when this step is taken, the residual nickel, cobalt and other valuable metals are recovered almost quantitatively, for the precipitated iron product obtained is substantially free of nickel and cobalt.

An advantage of the present process in which a portion of the sulfide is recycled is that a much higher rate of sulfide oxidation is obtainable, requiring less than one-fourth the time than when precipitation of the iron is accomplished. Another advantage is that all of the iron separated from the solution is or may be precipitated at a pH of about 5 under which condition the iron precipitate obtained is in a form which lends itself to more ready re-solution for the recovery of the occluded nickel and cobalt. Iron compounds precipitated at a lower pH in accordance with prior practice are more difficult to reprocess, as has hereinbefore been pointed out. In further comparison with the prior process producing basic iron sulfate, the instant invention has the advantage that no iron residue builds up in the autoclave to require shut downs for removal. Finally, no separate recovery step is required for collecting nickel or other valuable metals from a basic iron sulfate precipitate, for none is formed.

It should be understood that the present invention is not limited to the specific procedures and conditions of operation herein disclosed but that it extends to all equivalents which will occur to those skilled in the art upon consideration of the scope of the claims appended hereto.

I claim:

1. In the purification of non-ferrous metal sulfide mixtures precipitated from leach liquors obtained by the leaching of ores, which mixture of sulfides includes nickel sulfide with a ferrous sulfide impurity, having as an intermediate object the dissolution of the iron content along with the non-ferrous metal content and as its ultimate purpose the recovery of the non-ferrous metal content in purer form involving sulfation by the action of oxygen in aqueous acid solution, the improvement which comprises, introducing oxygen into an acidic aqueous suspension of said sulfides while the suspension is maintained at an elevated temperature under pressure above the vapor pressure of the solution until a substantial part but not all of the metal content including the iron has been sulfated and dissolved, discontinuing this sulfation operation before any of the iron content has precipitated, separating the product liquor containing the dissolved metal sulfates from the residue consisting of sulfides and separating the iron from the non-ferrous metals in said liquor.

2. In the purification of non-ferrous metal sulfide mixtures precipitated from leach liquors obtained by the leaching of ores, which mixtures of sulfides includes nickel sulfide with a ferrous sulfide impurity having as its final purpose the recovery of the non-ferrous metals in purer form involving the sulfation ultimately of all of the sulfide content including the iron before any iron is separated from the non-ferrous metals, by the action of oxygen in aqueous acid solution, the improvement which comprises, introducing oxygen into an acidic aqueous suspension of said sulfides while the suspension is maintained at an elevated temperature under pressure above the vapor pressure of the solution until a substantial part but not all of the metal content including the iron has been sulfated and dissolved, discontinuing this sulfation operation before any of the iron content has precipitated, separating the product liquor containing the dissolved metal sulfates from the residue consisting of sulfides, and recycling the residual metal sulfides by adding the same to the non-ferrous metal sulfides and iron sulfide to be treated by the process hereinbefore defined and separating the iron from the non-ferrous metals in said liquor.

3. In the purification of non-ferrous metal sulfide mixtures precipitated from leach liquors obtained by the leaching of ores, which mixture of sulfides includes nickel and cobalt sulfides with a ferrous sulfide impurity having as its final purpose the recovery of the non-ferrous metals in purer form involving sulfation ultimately of all of the sulfide content including the iron before any iron is separated from the non-ferrous metals, by the action of oxygen in aqueous acid solution, the improvement which comprises, introducing oxygen into an acidic aqueous suspension of the sulfide mixture while the suspension is maintained at an elevated temperature under pressure above the vapor pressure of the solution until a substantial part but not more than 90% of the metal content including the iron has been converted to the sulfate form and dissolved, separating the product liquor containing the dissolved metal sulfates from the residual metal sulfide content the latter being free of precipitated iron, recycling the residual metal sulfide content consisting of metal sulfides by adding the same to the mixture of non-ferrous metal sulfides and iron sulfide to be treated by the process hereinbefore defined, and separating the iron from the non-ferrous metals contained in the product liquor.

4. In the purification of non-ferrous metal sulfide mixtures precipitated from leach liquors obtained by the leaching of ores, which mixture of sulfides includes nickel sulfide with a ferrous sulfide impurity, having as an intermediate object the dissolution of the iron content along with the non-ferrous metal content and as its ultimate purpose the recovery of the non-ferrous metal content in purer form involving sulfation by the action of oxygen in aqueous acid solution, the improvement which comprises, introducing oxygen into an acidic aqueous suspension of the sulfide mixture while the suspension is maintained at an elevated temperature under pressure above the vapor pressure of the solution, thereby sulfating and dissolving metal sulfides therein, discontinuing said sulfation operation before more than about ninety percent of the sulfide content has been sulfated and before any of the iron content has precipitated, separating the residue consisting of sulfides and amounting to at least 10 percent of the amount of the sulfides originally present from the product liquor containing the dissolved sulfates, and separating the iron from the non-ferrous metals contained in the product liquor.

5. In the purification of non-ferrous metal sulfide mixtures precipitated from leach liquors obtained by the leaching of ores, which mixture of sulfides includes nickel sulfide with a ferrous sulfide impurity having as its final purpose the recovery of the non-ferrous metals in purer form involving sulfation ultimately of all of the sulfide content including the iron before any iron is separated from the non-ferrous metals, by the action of oxygen in aqueous acid solution, the improvement which comprises, introducing oxygen into an acidic aqueous suspension of the sulfide mixture while the suspension is maintained at an elevated temperature under pressure above the vapor pressure of the solution, thereby sulfating and dissolving metal sulfides therein, discontinuing said sulfation operation before more than about ninety per cent of the sulfide content has been sulfated and before any of the iron content has precipitated, separating the residue consisting of sulfides and amounting to at least 10 percent of the amount originally present, from the product liquor containing the dissolved sulfates, and recycling the residual metal sulfide content by adding the same to the mixture of non-ferrous metal sulfides and iron sulfide to be treated by the process hereinbefore defined.

6. In the purification of non-ferrous metal sulfide mixtures precipitated from leach liquors obtained by the leaching of ores, which mixture of sulfides includes one or more of the metals, nickel, cobalt, copper and zinc with a ferrous sulfide impurity having as its final purpose the recovery of the non-ferrous metals in purer form involving sulfation ultimately of all of the sulfide content including the iron before any iron is separated from the non-ferrous metals, by the introduction of oxygen into the sulfides while suspended in aqueous acidic solution maintained at elevated temperatures and pressures, the improvement which comprises introducing the oxygen into the suspension until a substantial part of the metal content has dissolved, and before any of the iron content precipitates out, separating the product liquor containing the dissolved metal sulfates from the residual metal sulfide content consisting of metal sulfides, recycling the residual metal sulfide content by adding the same to the sulfide mixture to be treated by the process hereinbefore defined, and separating the iron from the non-ferrous metals contained in the product liquor.

7. In the purification of non-ferrous metal sulfide mixtures precipitated from leach liquors obtained by the leaching of ores, which mixture of sulfides includes nickel sulfide with a ferrous sulfide impurity, having as an intermediate object the dissolution of the iron content along with the non-ferrous metal content and as its ultimate purpose the recovery of the non-ferrous metal content in purer form involving sulfation by the action of oxygen in aqueous acid solution, the improvement which comprises, introducing oxygen into an acidic aqueous suspension of the sulfide mixture while the suspension is maintained at an elevated temperature under pressure above the vapor pressure of the solution until between about 40 and 90% of the sulfide content has been sulfated and dissolved, and before any of the iron content has precipitated separating the product liquor containing the dissolved metal sulfates from the residual metal sulfide content consisting of metal sulfides.

8. In the purification of non-ferrous metal sulfide mixtures precipitated from leach liquors obtained by the leaching of ores, which mixture of sulfides includes nickel sulfide with a ferrous sulfide impurity having as its final purpose the recovery of the non-ferrous metals in purer form involving sulfation ultimately of all of the sulfide content including the iron before any iron is separated from the non-ferrous metals, by the action of oxygen in aqueous acid solution, the improvement which comprises, introducing oxygen into an acidic aqueous suspension of the sulfide mixture while the suspension is maintained at an elevated temperature under pressure above the vapor pressure of the solution until between about 40 and 90% of the sulfide content has been sulfated and dissolved and before any of the iron content has precipitated, separating the product liquor containing the dissolved metal sulfates from the residual metal sulfide content consisting of metal sulfides and recycling the residual metal sulfide content by adding the same to the mixture of non-ferrous metal sulfides and iron sulfide to be treated by the process hereinbefore defined.

9. In the purification of non-ferrous metal sulfide mixtures precipitated from leach liquors obtained by the leaching of ores, which mixture of sulfides includes one or more of the metals, nickel, cobalt, copper and zinc with a ferrous sulfide impurity having as its final purpose the recovery of the non-ferrous metals in purer form involving sulfation ultimately of all of the sulfide content including the iron before any iron is separated from the non-ferrous metals by the introduction of oxygen into the sulfides while suspended in aqueous acidic solution maintained at elevated temperatures and pressures, the improvement which comprises, introducing the oxygen into the suspension under the sulfating conditions until the sulfation and dissolution of about 40 to 90% of the metal content has been effected but none of the iron content has precipitated, separating the residue consisting of sulfides amounting to at least 10 percent of the amount originally present from the product liquor containing the dissolved sulfates, recycling the residual metal sulfide content by adding the same to the mixture of non-ferrous metal sulfides and iron sulfide to be treated by the process hereinbefore defined, and separating the iron from the non-ferrous metals contained in the product liquor.

10. In the sulfation of mixtures of nickel and other non-ferrous metal sulfides with iron sulfide impurities precipitated from leach liquors obtained by the leaching of ores, the sulfation being accomplished by means of oxygen in aqueous acid solution, where heretofore most of the non-ferrous metal content together with some of the iron has been taken up in solution leaving most of the iron in precipitated form together with some of the non-ferrous metal content as a residue, the improvement whereby the precipitation of the iron is completely avoided and all of the metal content is ultimately obtained in one and the same product liquor which comprises, adding the metal sulfide residue hereinafter defined to the sulfide mixture to be sulfated, forming an aqueous acidic suspension of the resulting mixture, introducing oxygen into the resulting suspension while the same is maintained at an elevated temperature and pressure above the vapor pressure of the solution until sulfation and dissolution of a substantial proportion of the metal content including the iron has occurred, discontinuing this sulfation operation before any of the iron content has precipitated, separating the product liquor containing the dissolved metal sulfates from the residual metal sulfide content consisting of metal sulfides, and recycling the residual metal sulfide content by adding the same to the mixture of non-ferrous metal sulfides and iron sulfide to be treated by the process hereinbefore defined.

11. In the purification of non-ferrous metal sulfide mixtures precipitated from leach liquors obtained by the leaching of ores, which mixture of sulfides includes nickel sulfide with a ferrous sulfide impurity having as its final purpose the recovery of the non-ferrous metals in purer form involving sulfation ultimately of all of the sulfide content including the iron before any iron is separated from the non-ferrous metals by the action of oxygen in aqueous acid solution, the improvement which comprises, continuously flowing the sulfide mixture in the form of a suspension in an aqueous acidic solution, into an autoclave, continuously introducing oxygen into the suspension while the same is maintained at an elevated temperature under pressure in said autoclave, thereby sulfating and dissolving the sulfides in a substantial proportion thereof, discontinuing this sulfation operation before any of the iron content has precipitated, continuously flowing from the autoclave the reacted mass containing the dissolved metal sulfates and undissolved residue consisting of metal sulfides still in suspended form amounting to at least 10% of the sulfide content, separating the product liquor from the undissolved metal sulfide solids, and continuously recycling the sulfide solids by adding the same to the autoclave.

12. In the purification of non-ferrous metal sulfide mixtures precipitated from leach liquors obtained by the leaching of ores, which mixture of sulfides includes nickel sulfide with a ferrous sulfide impurity having as its final purpose the recovery of the non-ferrous metals in purer form involving sulfation ultimately of all of the sulfide content including the iron before any iron is separated from the non-ferrous metals by the action of oxygen in aqueous acid solution, the improvement which comprises, continuously flowing the sulfide mixture in the form of a suspension in an aqueous acidic solution, into an autoclave, continuously introducing oxygen into the suspension while the same is maintained at an elevated temperature under pressure in said autoclave, thereby sulfating and dissolving the sulfides in a substantial proportion thereof, discontinuing this sulfation operation before any of the iron content has precipitated, continuously flowing from the autoclave the reacted mass containing the dissolved metal sulfates and undissolved residue consisting of metal sulfides still in suspended form amounting to at least 10% of the sulfide content, separating the product liquor from the undissolved metal sulfide solids, continuously recycling the sulfide solids by adding the same to the autoclave, and separating the iron from the non-ferrous metals contained in the product liquor.

References Cited in the file of this patent

UNITED STATES PATENTS

| | | |
|---|---|---|
| 2,588,265 | McGauley | Mar. 4, 1952 |
| 2,746,859 | McGauley et al. | May 22, 1956 |
| 2,864,692 | Mancke et al. | Dec. 16, 1958 |